(12) United States Patent
Kohn

(10) Patent No.: US 11,384,650 B2
(45) Date of Patent: Jul. 12, 2022

(54) SERVITUDE PASSAGE ARM FOR A TURBO MACHINE

(71) Applicant: SAFRAN AIRCRAFT ENGINES, Paris (FR)

(72) Inventor: Thierry Kohn, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 182 days.

(21) Appl. No.: 16/961,642

(22) PCT Filed: Jan. 10, 2019

(86) PCT No.: PCT/FR2019/050050
§ 371 (c)(1),
(2) Date: Jul. 10, 2020

(87) PCT Pub. No.: WO2019/138191
PCT Pub. Date: Jul. 18, 2019

(65) Prior Publication Data
US 2020/0340366 A1  Oct. 29, 2020

(30) Foreign Application Priority Data

Jan. 12, 2018 (FR) ...................................... 1850274

(51) Int. Cl.
*F01D 9/04* (2006.01)
*F01D 9/06* (2006.01)
*F02C 7/25* (2006.01)

(52) U.S. Cl.
CPC ............... *F01D 9/04* (2013.01); *F01D 9/065* (2013.01); *F02C 7/25* (2013.01)

(58) Field of Classification Search
CPC ............... F01D 9/04; F01D 9/065; F02C 7/24
See application file for complete search history.

(56) References Cited

U.S. PATENT DOCUMENTS

| 5,524,846 A * | 6/1996 | Shine | ..................... F02K 1/805 |
| | | | 60/796 |
| 2010/0132374 A1* | 6/2010 | Manteiga | ................ F01D 25/28 |
| | | | 415/213.1 |

(Continued)

FOREIGN PATENT DOCUMENTS

| GB | 2 497 934 A | 7/2013 |
| WO | WO 2015/028756 A1 | 3/2015 |

OTHER PUBLICATIONS

International Patent Application No. PCT/FR2019/050050, International Search Report and Written Opinion dated Apr. 15, 2019, 10 pgs.

*Primary Examiner* — Igor Kershteyn
(74) *Attorney, Agent, or Firm* — Lathrop GPM LLP

(57) ABSTRACT

The invention relates to a lead-through arm (30) for the auxiliaries of a turbomachine, intended to be mounted in a substantially radial direction of the turbomachine. The lead-through arm (30) comprises two fairing walls (32) connected at one of the axial ends thereof by a connecting element (34) and a transverse firewall (38) connecting the two fairing walls (32), characterised in that it comprises a firebreak member (36) disposed in the radial direction, said member (36) being elastically deformable and being inserted axially, and constrained elastically, between an axial end of the firewall (38) and the connecting element (34).

17 Claims, 5 Drawing Sheets

(56) References Cited

U.S. PATENT DOCUMENTS

| | | | |
|---|---|---|---|
| 2010/0135777 A1* | 6/2010 | Manteiga | F01D 9/02 |
| | | | 415/213.1 |
| 2010/0135786 A1* | 6/2010 | Manteiga | F01D 25/18 |
| | | | 415/232 |
| 2014/0060079 A1* | 3/2014 | Foster | F01D 25/28 |
| | | | 29/893.1 |
| 2019/0249570 A1* | 8/2019 | Barua | B22F 5/009 |
| 2020/0072080 A1* | 3/2020 | Franklin | F01D 25/14 |

* cited by examiner

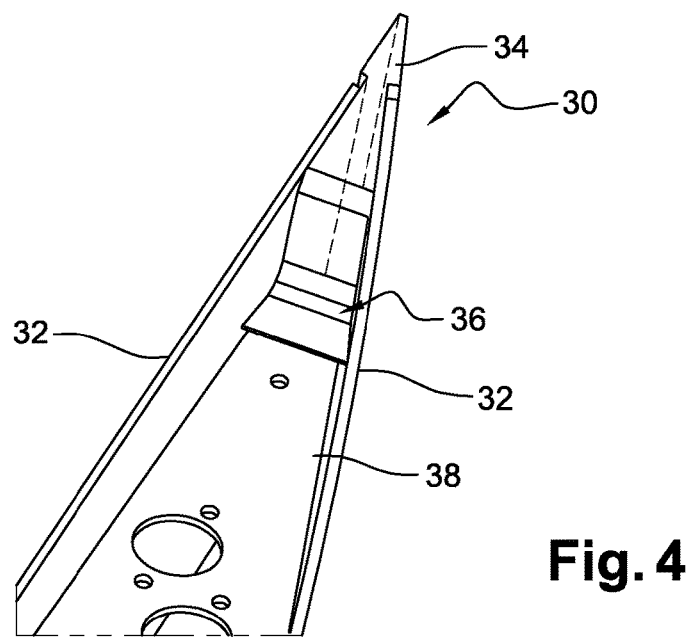
Fig. 4
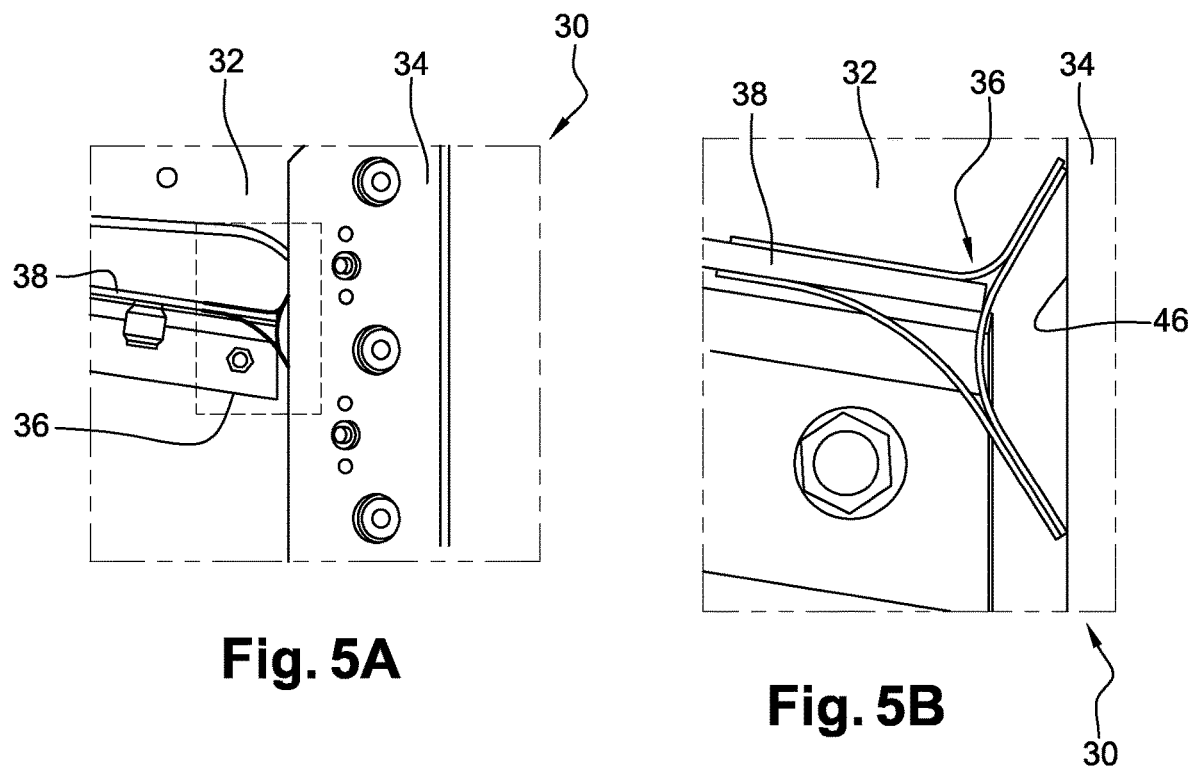
Fig. 5A
Fig. 5B

SERVITUDE PASSAGE ARM FOR A TURBO MACHINE

CROSS-REFERENCE TO RELATED APPLICATIONS

This application is a 35 U.S.C. § 371 filing of International Application No. PCT/FR2019/050050 filed Jan. 10, 2019, which claims the benefit of priority to French Patent Application No. 1850274 filed Jan. 12, 2018, each of which is incorporated herein by reference in its entirety.

FIELD OF THE INVENTION

The present invention concerns a radial arm of a turbomachine for the passage of servitudes such as electrical harnesses. It also concerns a turbomachine equipped with such an arm as well as an elastic member arranged in an arm.

BACKGROUND OF THE INVENTION

Classically, a turbomachine 10 as shown in FIG. 1 comprises radial arms for passing servitudes such as electrical harnesses, fuel, oil or air lines, in particular. In particular, we know of a radial arm 12 arranged at six o'clock with respect to the dial of a watch, this arm 12 extending radially from a zone known as the "core" or radially inner zone 14 to a radially outer nacelle 16 for the circulation of said servitudes 18, passing through the annular secondary air stream corresponding to a radially outer zone 20, known as the "fan" zone. The inner zone 14 is an annular zone extending around the turbojet engine and corresponds to a relatively high-temperature zone, of the order of 280° C. on average and varies in a temperature range between 210 and 360° C. As can be seen in FIG. 1, the arm 12 comprises a firewall 22 traversed by the servitudes 18 and arranged at the radially inner periphery of the annular secondary air duct 20. The function of wall 22 is to provide fire screen or firewall insulation of inner zone 14 and outer zone 20 from each other to prevent a fire from spreading from one zone into the other, thereby providing fire containment.

In practice, the boom 12 comprises two fairing walls 24 connected to each other at their downstream ends by a joining element 26 which forms a trailing edge element. In particular, the fairing walls 24 have their downstream ends engaged in a lateral recess 28 of the joining element 26 and are bolted to it. The fairings 24 and the connecting element ensure a continuous air flow to avoid aerodynamic disturbances.

As shown in FIGS. 2 and 3, fire-screen or firewall 22 extends between the two fairing walls 24. As can be seen, more specifically in FIG. 2, a J clearance is required to mount the downstream junction element 26 opposite the downstream end of the firewall 22. This clearance J makes it impossible to comply with the technical fire resistance requirements, i.e. to confine the fire for a minimum period of time under given temperature and pressure conditions.

It is therefore essential to increase the resistance to fire spread between the internal and external zones.

SUMMARY OF THE INVENTION

The present invention concerns first of all a servitude passage arm for a turbomachine and intended to be mounted in a substantially radial direction thereof, comprising two fairing walls connected at one of their axial ends by a junction element and a transverse firewall connecting said two fairing walls, characterised in that it comprises a member which is fireproof in the radial direction, this member being elastically deformable and being interposed axially and elastically constrained between an axial end of the fireproof wall and the junction element.

According to the invention, the fireproof seal, i.e. the limitation of flame propagation, is guaranteed between the end of the fireproof wall and the connecting element by means of an elastically deformable member elastically prestressed between these two parts. In this way, the spread of a fire from one side of the firewall to the other side of the firewall is limited.

According to a further feature, the fire barrier member comprises a first part clamped to said axial end of the fire barrier wall by elastic deformation of a second part elastically prestressed on the joining element.

When the connecting element is installed, it provides an elastic stress of the second part which allows the first part to be clamped to the firewall.

In a particular embodiment, the first part has a U-shape engaged on said end of the firewall and the second part has a V-shape whose top is connected to the base of the U and whose free ends are in elastic support on the joining element.

Thus, the second V-shaped part is deformed by elastic support on the connecting element while the first U-shaped part is clamped to the firewall.

According to an embodiment, the fire barrier element is made in one piece by successive folding operations.

In another embodiment, the member can be made by assembling at least a first and a second sheet metal integral with each other, each of the first and second sheets comprising a first branch and a second branch connected to each other by a bending zone, the first branches of the first and second sheets being applied to radially opposite faces of the end of the firewall, the free ends of the second branches of the first and second sheets bearing elastically on the joining element.

The elastic member may comprise a third connecting plate connecting the second branches of the first and second plates. It is understandable that this third sheet is optional since the connection between the first and second sheets can be made by other means. It should be noted, however, that the use of a third sheet is simple since it can be made in the same way as the first and second sheet, i.e. with the same manufacturing technique, thus limiting the manufacturing and assembly time of the elastic member.

The fireproof seal can be achieved by only one of the sheets of the elastic member, e.g. by means of the sheet which can then tightly connect the two fairing walls and the connecting element.

In a practical embodiment of the invention, the sheet or sheets are made of metal, more particularly stainless steel and have a thickness of between 0.4 and 0.8 mm.

According to another characteristic, said end may be a downstream end and the joining member is a trailing edge member of the arm.

The invention also concerns a turbomachine comprising at least one arm as described above, the firewall being arranged radially at the inner periphery of the annular secondary air flow.

It also relates to a fireproof elastic member comprising a first U-shaped part whose free ends are intended to be engaged on one end of a fireproof wall of a servitude passage arm in a turbomachine and a second part having a V-shape whose top is connected to the base of the U.

The elastic fireproof member may comprise at least a first and a second metal sheet integral with each other, each of the first and second metal sheets comprising a first branch and a second branch connected to each other by a bending zone, the first branches of the first and second metal sheets being arranged opposite each other, the second branches moving away from each other in a direction opposite to the first branches of said two metal sheets.

Of course, the member may comprise a third connecting plate connecting the second branches of the first and second plates.

The invention will be better understood and other details, characteristics and advantages of the invention will appear when reading the following description, which is given as a non-limiting example, with reference to the attached drawings.

BRIEF DESCRIPTION OF THE FIGURES

FIG. 4 shows a perspective schematic view of an arm according to the invention;

FIG. 5A is a perspective schematic view of the cooperation between the fire barrier wall and the downstream junction element;

FIG. 5B is a larger scale schematic view of the dotted area in FIG. 5A;

DETAILED DESCRIPTION

Figure 1:
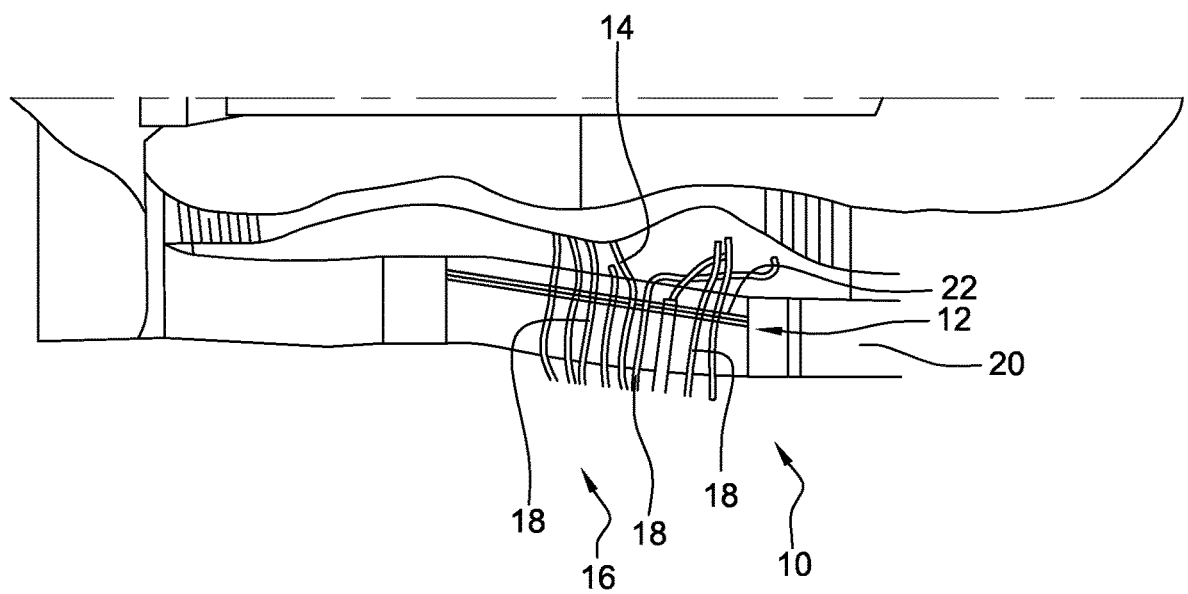
FIG. 1 is a schematic view, in axial section, of a turbine engine according to the known technique.
Figure 2:
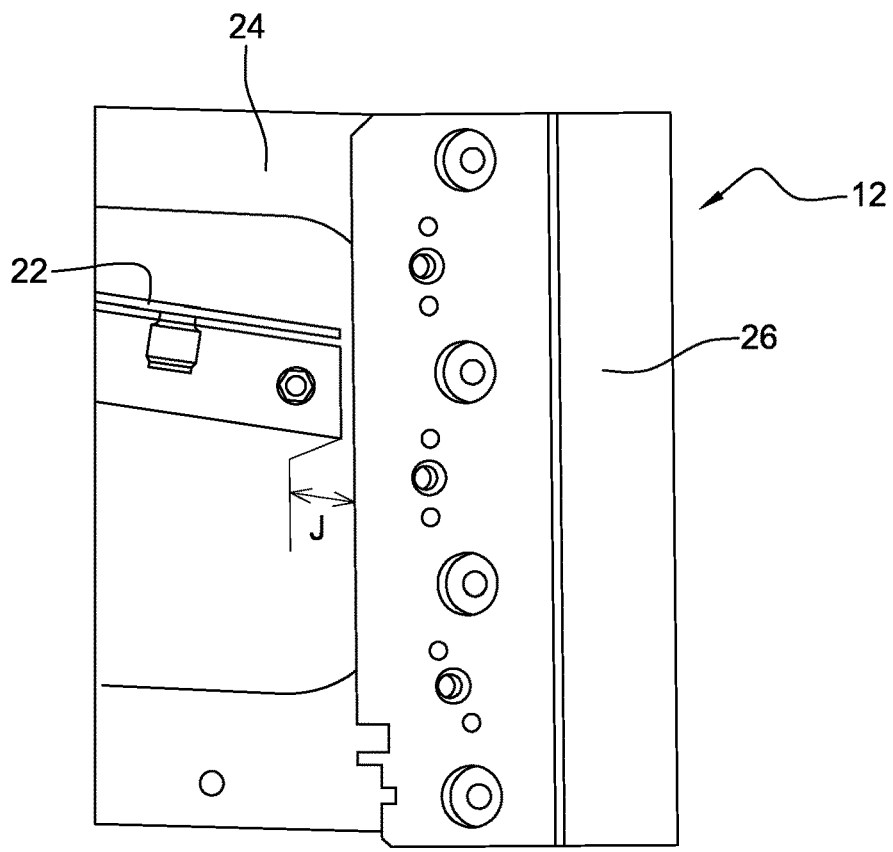
FIG. 2 is a schematic view of a downstream end of a servitude crossing arm, more specifically a fire-screen zone.
Figure 3:
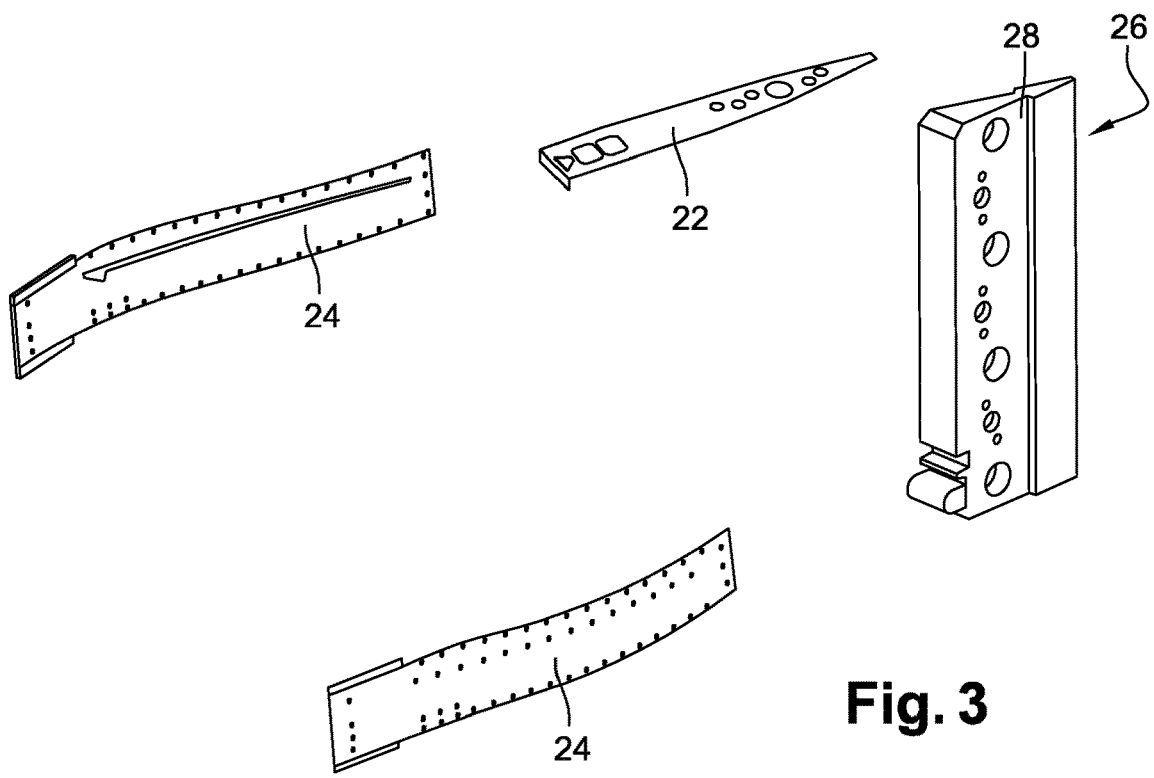
FIG. 3 is a perspective exploded view of the elements making up the arm.

Reference is now made to FIGS. 4, 5A and 5B which represent a radial arm 30 according to the invention intended to be arranged for example at six o'clock in a turbomachine as described in reference to FIG. 1 of the earlier technique. The radial arm 30 comprises two radial fairing walls 32 arranged circumferentially opposite each other and connected to each other at their downstream ends by a radially extending junction element 34. The fairing walls 32, the junction element 34 and the cooperation of these parts is identical to what has been previously described with reference to FIG. 1.

The arm 30 according to the invention differs from the known technique by the addition of a firewall member 36 which is interposed axially between the downstream end of the firewall 38 and the junction element 34 or trailing edge element. As shown in FIGS. 4, 5A and 5B, member 36 is an elastically deformable member that is elastically constrained between the downstream end of firewall 38 and junction element 34.

Figures 6A, 6B, 6C:
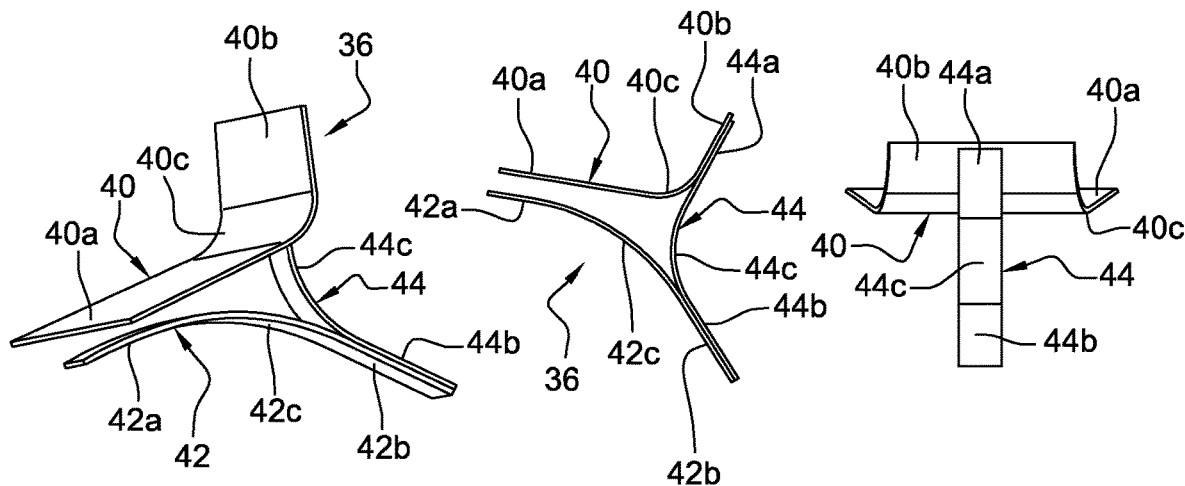
FIGS. 6A, 6B and 6C are schematic views of a possible embodiment of a fire-screen member according to the invention.
Figure 7:
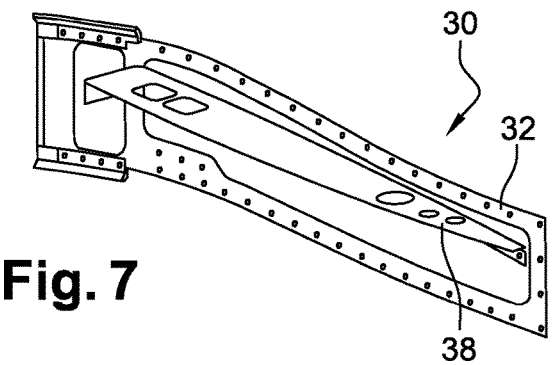
FIGS. 7 and 8 are perspective schematic views of the mounting sequence of an arm according to the invention.
Figure 8:
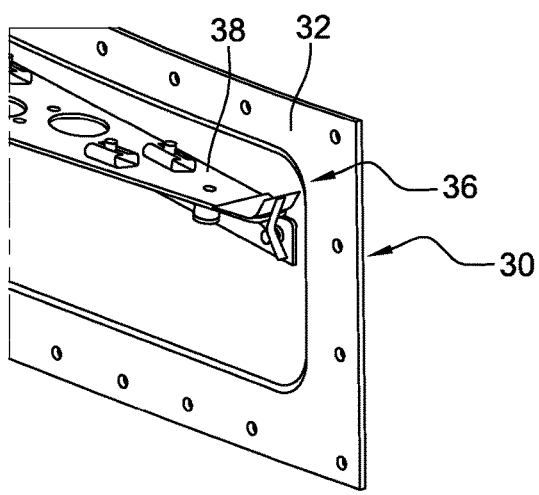

In a special embodiment of the elastic fire barrier element 36 visible in FIGS. 6A, 6B and 6C, it is formed by joining three thin sheets 40, 42, 44 in such a way that they can be elastically deformed. Thus, it comprises a first sheet 40, a second sheet 42 and a third sheet 44, each of the sheets 40, 42, 44 comprising a first branch 40a, 42a, 44a and a second branch 40b, 42b, 44b connected to each other by a bending zone 40c, 42c, 44c or curved portion. The first 40a, 42a, 44a and second 40b, 42b, 44b branches of each of the first 40, second 42 and third 44 sheets are substantially flat. The elastic member 36 is shaped in such a way that:

the first branch 40a, 42a, 44a of the first plate 40 and the first branch 40a of the second plate 42 are facing each other and define between them a housing for the insertion of the downstream end of the firewall 38, the second branch 40a of the first sheet 40 is attached to the first branch 44a of the third sheet 44 and the second branch 42a of the second sheet 42 is attached to the second branch 44b of the third sheet 44 so that the third sheet 44 connects the second branches 40b, 42b of the first 40 and second 42 sheets, the third plate 44 is positioned so that its bending zone 44c is positioned at the level of the bending zones 40c, 42c of the first 40 and second 42 plates.

Thus, it can be seen that the elastic member 36 consists of two parts, a first part which is U-shaped and is engaged on the downstream end of the firewall 38 and a second part which is V-shaped. The first U-shaped part is formed by the first branch 40a of the first sheet 40, the first branch 42a of the second sheet 42 and the bending area 44c of the third sheet 44. The second V-shaped part is formed by the second branch 40b of the first plate 40 and the first branch 44a of the third plate 44 as well as by the second branch 42b of the second plate 42 and the second branch 44b of the third plate 44, the apex of the V being formed by the curved area 44c.

The assembly is carried out as follows: the elastic member 36 is arranged so that its first U-shaped part engages the downstream end of the firewall 38. The assembly of the junction element 34 then ensures an elastic compression of the spring element 36 by pressing on the free ends of the V-shaped part. In addition, the elastic compression of the elastic member 36 and its shape also ensures that the first branches 40a, 42a of the first 40 and second 42 sheets are clamped to the firewall 38.

Each of the first 40, second 42 and third 44 sheets are obtained by folding. The second sheet 42 and the third sheet 44 have a substantially rectangular shape before folding while the first sheet 40 has a trapezoidal shape, more particularly a general isosceles trapezoidal shape. Of course, the second sheet 42 could have another shape such that the upstream and downstream edges are parallel and the side edges are curved for example, the important thing here is that each side edge has the shape of the inner face of the opposite fairing wall 32 and is in contact with it in order to provide a seal against the propagation of a flame.

The junction element 34 comprises a substantially radial upstream face 46 which is flat and extends from one of the fairing walls 32 to the other of the fairing walls 32, thereby providing a fire barrier function at the downstream end of the elastic member 36 and ensuring permanent elastic support of the free ends of the V-shaped part.

Sheets 40, 42, 44 are preferably made of stainless steel and advantageously of a metal with a low thermal conduction coefficient. Sheets 40, 42, 44 have preferably a thickness between 0.4 and 0.8 mm.

Figure 9:
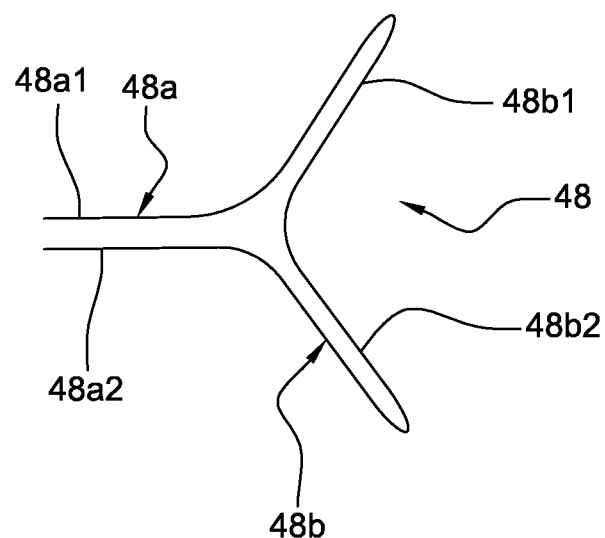
FIG. 9 is a sectional schematic view of another embodiment of a fire-screen member.

If member 36 has been described as comprising three sheets, it is understood that it may comprise only one sheet, i.e. it is made in one piece from a folded sheet. FIG. 9 shows a schematic illustration of such an embodiment of a fire barrier 48 which comprises a first part 48a in a U-shape intended to engage the downstream end of the fire barrier wall 38 and a second part 48b in a V-shape providing elastic support as described above. This second part comprises two branches 48b1 and 48b2 delimiting the V-shaped part and connected to each other at an apex at the first part 48*a* in a U-shape also formed of two branches 48*a*1 and 48*a*2.

The invention claimed is:

1. Servitude passage arm for a turbomachine and intended to be mounted in a substantially radial direction thereof, comprising two fairing walls connected at one of their axial ends by a junction element and a transverse firewall connecting said two fairing walls, characterised in that it comprises a member which is fireproof in the radial direction, this member being elastically deformable and being interposed axially and elastically constrained between an axial end of the fireproof wall and the junction element.

2. Arm according to claim 1, wherein the fire barrier member comprises a first part clamped to said axial end of the fire barrier wall by elastic deformation of a second part elastically prestressed on the joining element.

3. Arm according to claim 2, wherein the first part has a U-shape whose free ends are engaged on said end of the firewall and the second part has a V-shape whose top is connected to the base of the U and whose free ends are in elastic support on the junction element.

4. Arm according to claim 1, wherein the fireproof member is produced by an assembly of at least a first and a second sheet-metal part integral with each other, each of the first and second sheet-metal parts comprising a first branch and a second branch connected to each other by a curved zone, the first branches of the first and second metal sheets being applied to radially opposite faces of the end of the fireproof sealing wall, the free ends of the second branches of the first and second metal sheets being in elastic abutment on the junction element, a third connecting metal sheet connecting the second branches of the first and second metal sheets.

5. Arm according to claim 2, wherein the fireproof member is produced by an assembly of at least a first and a second sheet-metal part integral with each other, each of the first and second sheet-metal parts comprising a first branch and a second branch connected to each other by a curved zone, the first branches of the first and second metal sheets being applied to radially opposite faces of the end of the fireproof sealing wall, the free ends of the second branches of the first and second metal sheets being in elastic abutment on the junction element, a third connecting metal sheet connecting the second branches of the first and second metal sheets.

6. Arm according to claim 3, wherein the fireproof member is produced by an assembly of at least a first and a second sheet-metal part integral with each other, each of the first and second sheet-metal parts comprising a first branch and a second branch connected to each other by a curved zone, the first branches of the first and second metal sheets being applied to radially opposite faces of the end of the fireproof sealing wall, the free ends of the second branches of the first and second metal sheets being in elastic abutment on the junction element, a third connecting metal sheet connecting the second branches of the first and second metal sheets.

7. Arm according to claim 1, in which the fireproof member is made in one piece by successive folding operations.

8. Arm according to claim 2, in which the fireproof member is made in one piece by successive folding operations.

9. Arm according to claim 3, in which the fireproof member is made in one piece by successive folding operations.

10. Arm according to claim 3, wherein the first sheet is a fireproof sheet sealingly connecting the two fairing walls and the junction element.

11. Arm according to claim 4, wherein the first sheet is a fireproof sheet sealingly connecting the two fairing walls and the junction element.

12. Arm according to claim 7, wherein the first sheet is a fireproof sheet sealingly connecting the two fairing walls and the junction element.

13. Arm according to claim 4, wherein the sheet or sheets are made of metal, more particularly stainless steel, and have a thickness of between 0.4 and 0.8 mm.

14. Arm according to claim 7, wherein the sheet or sheets are made of metal, more particularly stainless steel, and have a thickness of between 0.4 and 0.8 mm.

15. Arm according to claim 10, wherein the sheet or sheets are made of metal, more particularly stainless steel, and have a thickness of between 0.4 and 0.8 mm.

16. Arm according to claim 1, wherein said axial end is be a downstream end and the junction element is a trailing edge member of the arm.

17. Turbomachine comprising at least one arm according to claim 1, the firewall being arranged radially at the inner periphery of the annular secondary air flow.

* * * * *